US010458166B2

(12) United States Patent
Yamaguchi

(10) Patent No.: US 10,458,166 B2
(45) Date of Patent: Oct. 29, 2019

(54) PLUG DOOR DEVICE

(71) Applicant: NABTESCO CORPORATION, Tokyo (JP)

(72) Inventor: Atsuhito Yamaguchi, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 106 days.

(21) Appl. No.: 15/475,955

(22) Filed: Mar. 31, 2017

(65) Prior Publication Data

US 2017/0284139 A1  Oct. 5, 2017

(30) Foreign Application Priority Data

Apr. 1, 2016 (JP) .................................. 2016-074588

(51) Int. Cl.
*E05F 15/638* (2015.01)
*E05D 15/10* (2006.01)
(Continued)

(52) U.S. Cl.
CPC ....... *E05D 15/1044* (2013.01); *B61D 19/009* (2013.01); *E05B 83/06* (2013.01);
(Continued)

(58) Field of Classification Search
None
See application file for complete search history.

(56) References Cited

U.S. PATENT DOCUMENTS 3,386,204 A * 6/1968 Obata ........................ B60J 5/06
49/212
5,271,181 A * 12/1993 Pietro ....................... B60J 5/062
49/118
(Continued)

FOREIGN PATENT DOCUMENTS

CN      102661101 A      9/2012
CN      103415668 A      11/2013
(Continued)

OTHER PUBLICATIONS

Extended European Search Report EP Application No. 17163718.4 dated Sep. 1, 2017.
(Continued)

*Primary Examiner* — Marcus Menezes
(74) *Attorney, Agent, or Firm* — Pillsbury Winthrop Shaw Pittman, LLP

(57) ABSTRACT

One object is to provide a plug door device that can make a contribution to a size reduction thereof, while suppressing a decrease in airtightness of a door. A plug door device is provided with an electric motor, a plug operation portion that moves a door in a width direction of a vehicle, a front-back operation portion that moves the door in a front-back direction of the vehicle, a movement suppressing portion that can suppress movement of the door in the front-back direction, and a planetary gear mechanism that distributes a drive force of the electric motor to the plug operation portion when movement of the door in the front-back direction is suppressed by the movement suppressing portion, and distributes a drive force of the electric motor to the front-back operation portion when movement of the door in the front-back direction is not suppressed by the movement suppressing portion.

9 Claims, 7 Drawing Sheets

(51) Int. Cl.
*E05F 5/00* (2017.01)
*E05F 15/646* (2015.01)
*E05F 15/655* (2015.01)
*E05F 15/662* (2015.01)
*B61D 19/00* (2006.01)
*E05B 83/06* (2014.01)
*F16H 1/28* (2006.01)
*F16H 19/04* (2006.01)
*F16H 19/06* (2006.01)

(52) U.S. Cl.
CPC ............ *E05F 5/003* (2013.01); *E05F 15/638* (2015.01); *E05F 15/646* (2015.01); *E05F 15/655* (2015.01); *E05F 15/662* (2015.01); *E05Y 2201/434* (2013.01); *E05Y 2201/652* (2013.01); *E05Y 2201/716* (2013.01); *E05Y 2201/72* (2013.01); *E05Y 2201/722* (2013.01); *E05Y 2900/51* (2013.01); *F16H 1/28* (2013.01); *F16H 19/04* (2013.01); *F16H 19/06* (2013.01); *F16H 2019/0686* (2013.01)

(56) References Cited

U.S. PATENT DOCUMENTS

| | | | | |
|---|---|---|---|---|
| 5,483,769 | A * | 1/1996 | Zweili | B61D 19/008 49/118 |
| 6,637,803 | B2 * | 10/2003 | Moreau | E05F 15/646 296/146.5 |
| 2007/0163179 | A1 * | 7/2007 | Fukumura | H02K 7/116 49/360 |
| 2009/0107048 | A1 * | 4/2009 | Nagai | E05B 81/20 49/280 |
| 2014/0020299 | A1 * | 1/2014 | Takahashi | B61D 19/02 49/173 |
| 2015/0145264 | A1 | 5/2015 | Takahashi et al. | |
| 2016/0305169 | A1 | 10/2016 | Takahashi et al. | |

FOREIGN PATENT DOCUMENTS

| | | | | |
|---|---|---|---|---|
| EP | 0837209 | A2 * | 4/1998 | ........ E05D 15/1007 |
| EP | 1188636 | A | 3/2002 | |
| EP | 2348181 | A1 | 7/2011 | |
| EP | 2685034 | A1 | 1/2014 | |
| EP | 2860079 | A1 | 4/2015 | |
| JP | 2-27509 | B2 | 6/1990 | |
| JP | 2010-095939 | A | 4/2010 | |
| JP | 2012-188859 | A | 10/2012 | |
| JP | 2012-202140 | A | 10/2012 | |
| JP | 2015-004246 | A | 1/2015 | |

OTHER PUBLICATIONS

Office Action Canadian Patent Application No. 2962867 dated Mar. 27, 2018.
Office Action dated Jan. 7, 2019 issued in corresponding Canadian Patent Application No. 2,962,867.
First Office Action Chinese Patent Application No. 201710196775.4 dated Aug. 15, 2018 with English translation.

* cited by examiner

PLUG DOOR DEVICE

CROSS-REFERENCE TO RELATED APPLICATIONS

This application is based on and claims the benefit of priority from Japanese Patent Application Serial No. 2016-074588 (filed on Apr. 1, 2016), the contents of which are hereby incorporated by reference in their entirety.

TECHNICAL FIELD

The present invention relates to a plug door device for a vehicle.

BACKGROUND

Conventionally, there is known a plug door device that opens/closes a door installed at a doorway of a railroad vehicle or the like. According to one example of the conventional plug door device, when opened/closed, the door is moved in a front-back direction of the vehicle while being moved in a width direction of the vehicle, According to the plug door device thus configured, a seal member attached to a peripheral edge of the door considerably rubs against a wall surface of the doorway and thus becomes worn, so that airtightness of the door is likely to be decreased.

Japanese Examined Patent Application Publication No, Hei 2-27509 ("the '509 Publication") discloses one example of a technique solving the above-described problem. A plug door device described in the '509 Publication is provided with a first drive source that moves a plug door in a width direction of a vehicle and a second drive source that moves the plug door in an open/close direction that is a front-back direction of the vehicle. In this plug door device, for example, in a case of moving the door from a close position to an open position, the plug door is moved outward in the width direction of the vehicle by the first drive source and then is moved to an open direction by the second drive source. According to the plug door device of the '509 Publication, movement of the door in the width direction is independent of movement of the door in the front-back direction, so that a seal member attached to a peripheral edge of the plug door is unlikely to considerably rub against a wall surface of a doorway. Thus, there can be suppressed a decrease in airtightness of the door due to wearing of the seal member.

The above-described plug door device, however, uses a plurality of drive sources to perform an open/close operation of the door and thus is likely to be increased in size. The present invention has as its object to provide a plug door device that can make a contribution to a size reduction thereof, while suppressing a decrease in airtightness of a door.

SUMMARY

A plug door device according to one mode of the present invention is provided with a drive source, a plug operation portion that, based on a drive force of the drive source, moves a door installed at a doorway of a vehicle in a width direction of the vehicle, a front-back operation portion that, based on a drive force of the drive source, moves the door in a front-back direction of the vehicle, a movement suppressing portion that can suppress movement of the door in the front-back direction, and a planetary gear mechanism that distributes a drive force of the drive source to the plug operation portion in a case where movement of the door in the front-back direction is suppressed by the movement suppressing portion, and distributes a drive force of the drive source to the front-back operation portion in a case where movement of the door in the front-back direction is not suppressed by the movement suppressing portion.

In a case where movement of the door in the front-back direction is suppressed by the movement suppressing portion, by the planetary gear mechanism, a drive force of the drive source is distributed to the plug operation portion. Thus, the plug operation portion is driven to move the door in the width direction. On the other hand, in a case where movement of the door in the front-back direction is not suppressed by the movement suppressing portion, by the planetary gear mechanism, a drive force of the drive source is distributed to the front-back operation portion. Thus, the front-back operation portion is driven to move the door in the front-back direction. As described above, according to the above-described plug door device, an open/close operation of the door can be performed by using a single drive source, and thus a contribution can be made to a size reduction of the device. Furthermore, in a case where the plug operation portion is driven to move the door in the width direction in a state where movement of the door in the front-back direction is suppressed by the movement suppressing portion, independently of movement of the door in the front-back direction, only movement of the door in the width direction can be performed. Thus, there can be suppressed a decrease in airtightness due to wearing of the seal member at the peripheral edge of the door. As described above, according to the above-described plug door device, a contribution can be made to a size reduction of the plug door device, while a decrease in airtightness of a door is suppressed.

According to one mode of the above-described plug door device, during a time when the door moves a predetermined distance in the width direction from a close position at which the doorway is closed, the movement suppressing portion suppresses movement of the door in the front-back direction, and when the door is at a position to which the door has moved the predetermined distance in the width direction from the close position, the movement suppressing portion permits movement of the door in the front-back direction.

According to the above-described plug door device, after the door has moved the predetermined distance in the width direction from the close position, movement of the door in the front-back direction is permitted, and thus when the door moves from the close position to an open position, it is easy to perform movement of the door in the width direction and movement of the door in the front-back direction independently of each other. Furthermore, after the door has moved a predetermined distance in the front-back direction from the open position, movement of the door in the front-back direction is suppressed, and thus when the door moves from the open position to the close position, it is easy to perform movement of the door in the width direction and movement of the door in the front-back direction independently of each other.

According to one mode of the above-described plug door device, the plug operation portion includes a rack that is fixed to the vehicle and extends in the width direction of the vehicle and a pinion that is engaged with the rack and to which a drive force of the drive source is transmitted via the planetary gear mechanism.

According to the above-described plug door device, the plug operation portion is configured by including the rack and the pinion, and thus a configuration of the plug door device can be simplified.

According to one mode of the above-described plug door device, the planetary gear mechanism includes a sun gear to which a drive force of the drive source is inputted, a plurality of planetary gears that are engaged with the sun gear, a ring gear that is disposed around the planetary gears and engaged with the planetary gears, and a carrier that supports the plurality of planetary gears. Rotation of one of the ring gear and the carrier is transmitted to the pinion to cause the door to move in the width direction, and rotation of the other of the ring gear and the carrier is transmitted to the front-back operation portion to cause the door to move in the front-back direction.

According to the above-described plug door device, in a case where movement of the door in the front-back direction is suppressed by the movement suppressing portion, a drive force of the drive source inputted to the sun gear is transmitted to one of the ring gear and the carrier via the planetary gears, and thus the pinion rotates to cause the door to move in the width direction. On the other hand, in a case where movement of the door in the front-back direction is not suppressed by the movement suppressing portion, a drive force of the drive source inputted to the sun gear is transmitted from the other of the ring gear and the carrier to the front-back operation portion via the planetary gears. Thus, the door moves in the front-back direction. As described above, according to the above-described plug door device, by using the single drive source, movement of the door in the width direction and movement of the door in the front-back direction can be performed independently of each other, and thus a contribution can be made to a size reduction of the device, while a decrease in airtightness of the door can be suppressed.

According to one mode of the above-described plug door device, the movement suppressing portion includes a guide rail that is mounted to the vehicle and a shaft member that is mounted to the door and moves along the guide rail. The guide rail includes a first portion that extends in the width direction and suppresses movement of the shaft member in the front-back direction.

According to the above-described plug door device, the movement suppressing portion can be constituted by the guide rail and the shaft member that moves along the guide rail, and thus a configuration of the plug door device can be simplified.

According to one mode of the above-described plug door device, the guide rail includes a second portion that extends in the front-back direction continuously with the first portion and permits movement of the shaft member in the front-back direction, while suppressing movement of the shaft member in the width direction.

According to the above-described plug door device, movement of the door in the front-back direction can be guided by the guide rail and the shaft member of the movement suppressing portion, and thus a configuration of the plug door device can be simplified.

According to one mode of the above-described plug door device, there are further provided a fixed base that is fixed to the vehicle and includes the guide rail and a slide base that is movable in the width direction with respect to the fixed base by the plug operation portion and to which the drive source, the front-back operation portion, and the planetary gear mechanism are mounted.

According to this plug door device, the drive source, the front-back operation portion, and the planetary gear mechanism move in the width direction together with the slide base, and thus an open/close operation of the door can be performed. Thus, in order to be able to realize an open/close operation of the door, the slide base is only required to move in the width direction, and thus a configuration of the plug door device can be simplified.

According to one mode of the above-described plug door device, the rack is mounted to the fixed base.

According to this plug door device, the pinion moves along the rack mounted to the fixed base, and thus the slide base and the door can be moved in the width direction with respect to the fixed base. Thus, a configuration of the plug door device can be simplified.

According to one mode of the above-described plug door device, the front-back operation portion includes a pair of pulleys that are disposed within a width of the doorway in the front-back direction so as to be spaced from each other in the front-back direction and a belt wound around the pair of pulleys.

According to the above-described plug door device, the front-back operation portion is disposed within the width of the doorway in the front-back direction of the vehicle, and thus an increase in installation space of the plug door device can be suppressed.

According to one mode of the above-described plug door device, there is further provided a guiding support portion that supports the slide base and guides movement of the slide base in the width direction with respect to the fixed base, and the guiding support portion is mounted to each of both end portions of the slide base in the front-end direction.

According to the above-described plug door device, the guiding support portion is mounted to the slide base, and thus movement of the slide base and a plug door in the width direction of the vehicle can be performed smoothly.

According to one mode of the above-described plug door device, an output shaft of the drive source is disposed coaxially with the planetary gear mechanism.

According to the above-described plug door device, compared with a case where the output shaft of the drive source is not disposed coaxially with the planetary gear mechanism, a further size reduction of the plug door device can be achieved.

Advantages

According to the plug door device of the present invention, a contribution can be made to a size reduction of the plug door device, while a decrease in airtightness of a door is suppressed.

Figure 1:
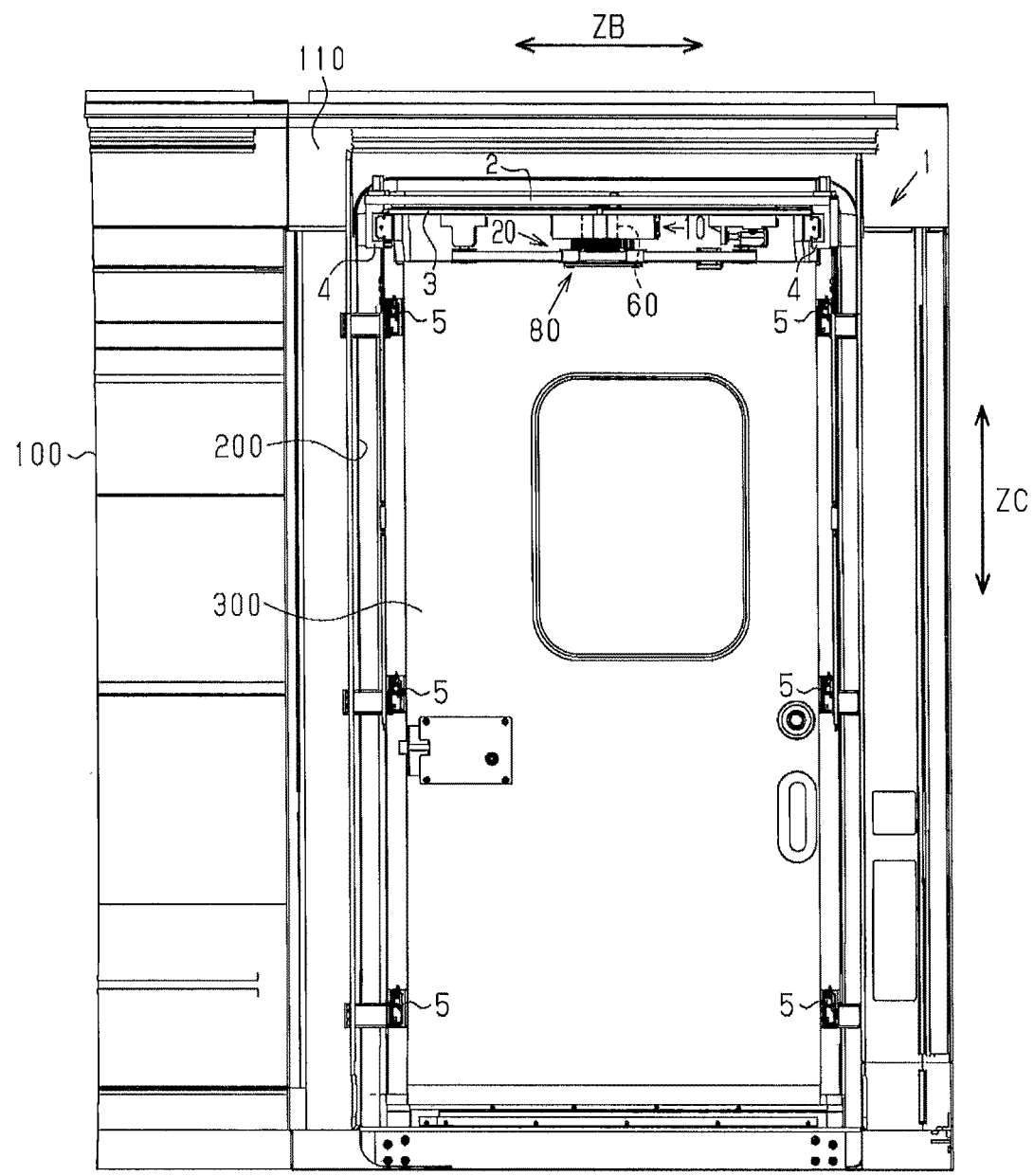
FIG. 1 is an external view of a vehicle in which a plug door device of an embodiment is disposed.

DESCRIPTION OF THE PREFERRED EMBODIMENTS (Embodiment) As shown in FIG. 1, a plug door device 1 may be configured to open/close a door 300 installed at, for example, a doorway 200 of a railroad vehicle 100. The plug door device 1 may be provided with a fixed base 2 that is fixed to a vehicle body 110 of the railroad vehicle 100, a slide base 3 that is movable in a width direction ZA (see FIG. 2) of the vehicle body 110 with respect to the fixed base 2, and a guiding support portion 4 that supports the slide base 3 and guides movement of the slide base 3 in the width direction ZA with respect to the fixed base 2.

The plug door device 1 may be provided further with a plug operation portion 10 that moves the door 300 in the width direction ZA (see FIG. 2) of the vehicle body 110, a front-back operation portion 20 that moves the door 300 in a front-back direction ZB of the vehicle body 110, and an electric motor 60 as a drive source that drives the plug operation portion 10 and the front-back operation portion 20. Another example of the drive source may be an air motor.

The plug door device 1 may be provided also with a movement suppressing portion 70 (see FIG. 3) that permits movement of the door 300 in the width direction ZA, while being able to suppress movement of the door 300 in the front-back direction ZB and a planetary gear mechanism 80 that distributes a drive force of the electric motor 60 to the plug operation portion 10 and to the front-back operation portion 20. When the door 300 is at a close position at which the doorway 200 is closed, a position of the door 300 with respect to the vehicle body 110 may be fixed by six lock units 5 that are mounted so as to be spaced from each other along the front-back direction ZB and a height direction ZC of the vehicle body 110. A seal member (depiction thereof is omitted) may be attached to an outer edge of the door 300 where the door 300 comes in contact with the doorway 200, and thus when at the close position, the door 300 may seal the doorway 200.

Figure 2:
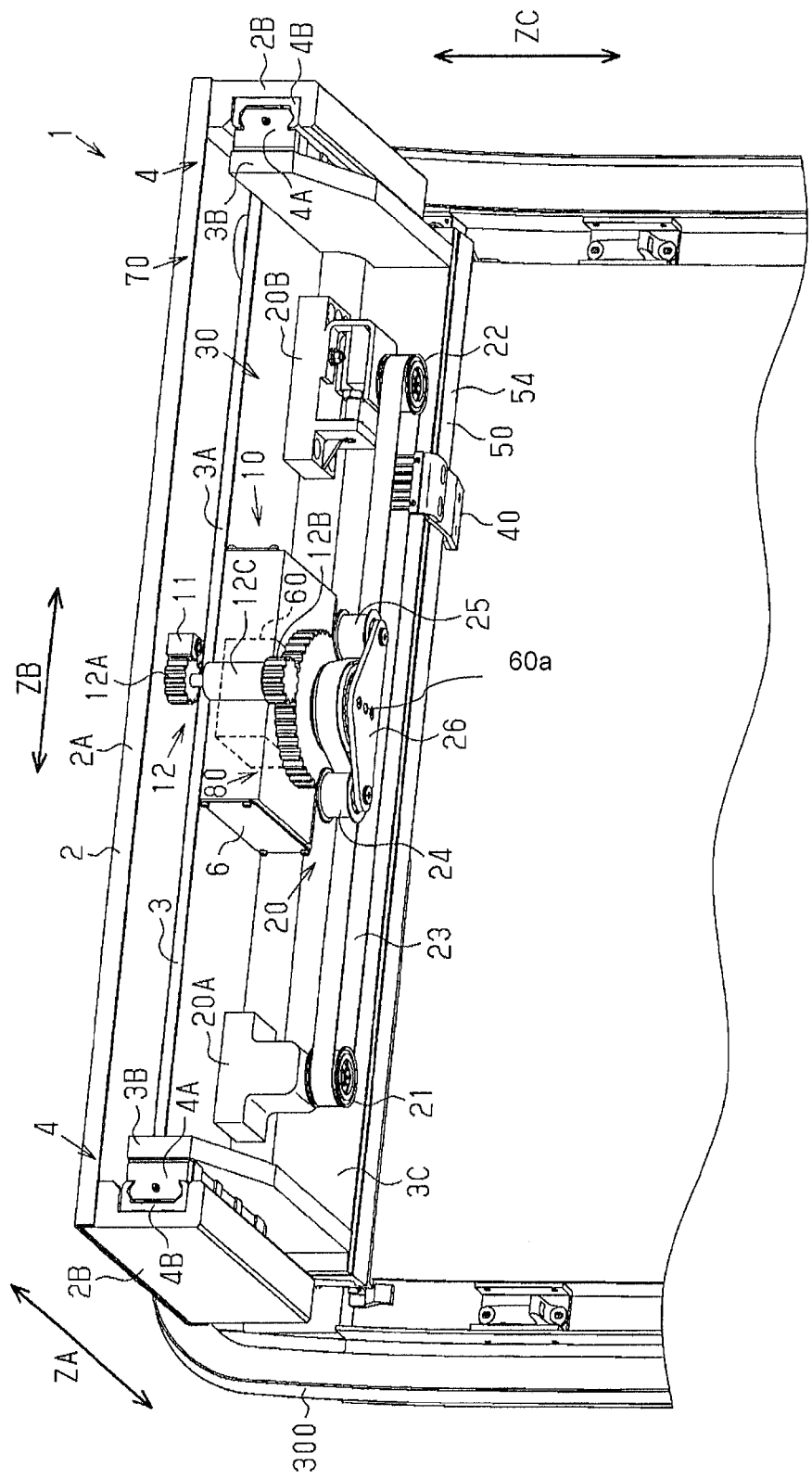
FIG. 2 is a perspective view, taken from a bottom surface side, of the plug door device of FIG. 1, where the plug door device is arranged on a top surface side of the vehicle.

As shown in FIG. 2, the fixed base 2 may have such a shape as to cover the slide base 3 and be provided with a plate-shaped fixed base portion 2A and a pair of fixed side walls 2B that extend in the width direction ZA of the vehicle body 110 from below both end portions of the fixed base portion 2A in the front-back direction ZB.

While the fixed base portion 2A may be fixed to the vehicle body 110 (see FIG. 1), the fixed side walls 2B may be fixed to the fixed base portion 2A. Thus, there may occur no change in relative position of the fixed base 2 with respect to the vehicle body 110 (see FIG. 1).

The slide base 3 may be provided with a plate-shaped slide base portion 3A that is disposed so as to be spaced from the fixed base portion 2A in the height direction ZC of the vehicle body 110, a pair of slide side walls 3B that extend in the width direction ZA of the vehicle body 110 from below both end portions of the slide base portion 3A in the front-back direction ZB, and a slide front wall 3C that is linked to the slide base portion 3A and faces the door 300.

The guiding support portion 4 may be provided with a pair of guides 4A that extend in the width direction ZA and a pair of rails 4B. The pair of guides 4A may be fixed to the slide side walls 3B of the slide base 3, respectively. The pair of rails 4B may be fixed to the fixed side walls 2B of the fixed base 2, respectively. The guides 4A and the slide base 3 may move in the width direction ZA along the pair of rails 4B.

Figure 3:
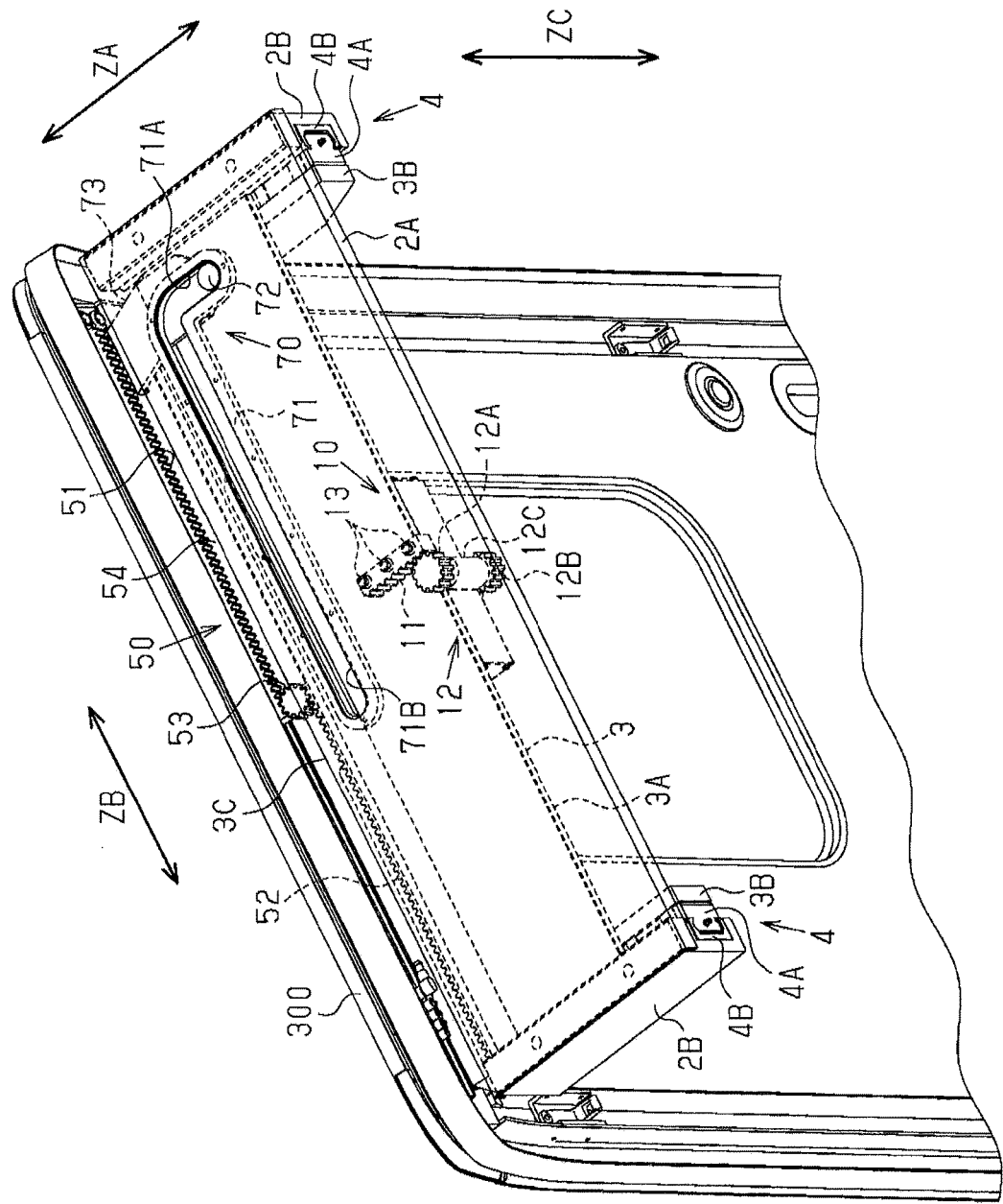
FIG. 3 is a perspective view, on a plane surface side, of the plug door device shown in FIG. 1.

As shown in FIG. 2 and FIG. 3, the plug operation portion 10 may be provided with a rack 11 that is mounted to a bottom surface of the fixed base portion 2A and a rotary portion 12 to which an output of the electric motor 60 is transmitted via the planetary gear mechanism 80.

The rack 11 may extend in the width direction ZA and be fixed to the fixed base portion 2A with a bolt 13. The rotary portion 12 may be provided with a pinion 12A that is engaged with the rack 11, a relay gear 12B to which rotation of the planetary gear mechanism 80 is transmitted, and a coupling shaft 12C that links the pinion 12A to the relay gear 12B and rotates together with the pinion 12A and the relay gear 12B.

As shown in FIG. 2 or FIG. 3, the front-back operation portion 20 may be provided with an in-base placement portion 30 that is disposed in an inner portion of the slide base 3, a door coupling member 40 that couples the in-base placement portion 30 to a double-speed rail 50, and the double-speed rail 50 that is disposed between the slide base 3 and the door 300.

The in-base placement portion 30 may be movable in the width direction ZA together with the slide base 3. The in-base placement portion 30 may include a first pulley 21 and a second pulley 22 that are disposed within a width of the doorway 200 (see FIG. 1) in the front-back direction ZB so as to be spaced from each other in the front-back direction ZB and a belt 23 that is wound around the first pulley 21 and the second pulley 22. The in-base placement portion 30 may be provided further with a first support portion 20A that rotatably supports the first pulley 21, a second support portion 20B that rotatably supports the second pulley 22, a pair of guide rollers 24 and 25 that guide the belt 23, and a roller coupling member 26 that supports the guide roller 24 and the guide roller 25.

The first pulley 21 may be supported by the first support portion 20A mounted to a bottom surface of the slide base portion 3A, and thus when the slide base 3 moves in the width direction ZA, the first pulley 21 moves in the width direction ZA together with the slide base 3. That is, there may occur no change in relative position of the first pulley 21 with respect to the slide base 3.

Similarly, the second pulley 22 may be supported by the second support portion 20B mounted to the bottom surface of the slide base portion 3A, and thus when the slide base 3 moves in the width direction ZA, the second pulley 22 moves in the width direction ZA together with the slide base 3. That is, there may occur no change in relative position of the second pulley 22 with respect to the slide base 3. In order to adjust a tension of the belt 23, the second pulley 22 may be positionally adjustable in the front-back direction ZB.

The guide rollers 24 and 25 may be fixed, via the roller coupling member 26, to a housing case 6 that houses the electric motor 60, and thus when the slide base 3 moves in the width direction ZA, the guide rollers 24 and 25 move in the width direction ZA together with the slide base 3 and the belt 23. That is, there may occur no change in relative position of the guide rollers 24 and 25 with respect to the slide base 3.

The door coupling member 40 may be a member extending in the width direction ZA, and one end thereof in the width direction ZA is connected to the belt 23, while the other end thereof in the width direction ZA is connected to the double-speed rail 50. As shown in FIG. 3, the double-speed rail 50 may be provided with a door-side rack 51 that is mounted to the door 300, a base-side rack 52 that is fixed to the slide front wall 3C of the slide base 3, a pinion 53 that is engaged with the door-side rack 51 and with the base-side rack 52, and a pinion support portion 54 that rotatably supports the pinion 53. The double-speed rail 50 may increase a moving speed of the belt 23 and transmit the increased moving speed to the door 300.

The door-side rack 51 and the base-side rack 52 may be disposed parallel to each other and extend in the front-back direction ZB. The door-side rack 51 and the base-side rack 52 may be equal to each other in dimension in the front-back direction ZB.

The pinion support portion 54 may be disposed, in the width direction ZA, between the slide front wall 3C of the slide base 3 and the door 300 and coupled to the door coupling member 40 (see FIG. 2). The pinion support portion 54 may be disposed, in the height direction ZC, on a lower side than the door-side rack 51 and the base-side rack 52. The pinion support portion 54 may extend in the front-back direction ZB and be longer in dimension in the front-back direction ZB than the door-side rack 51 and the base-side rack 52.

Figure 4:
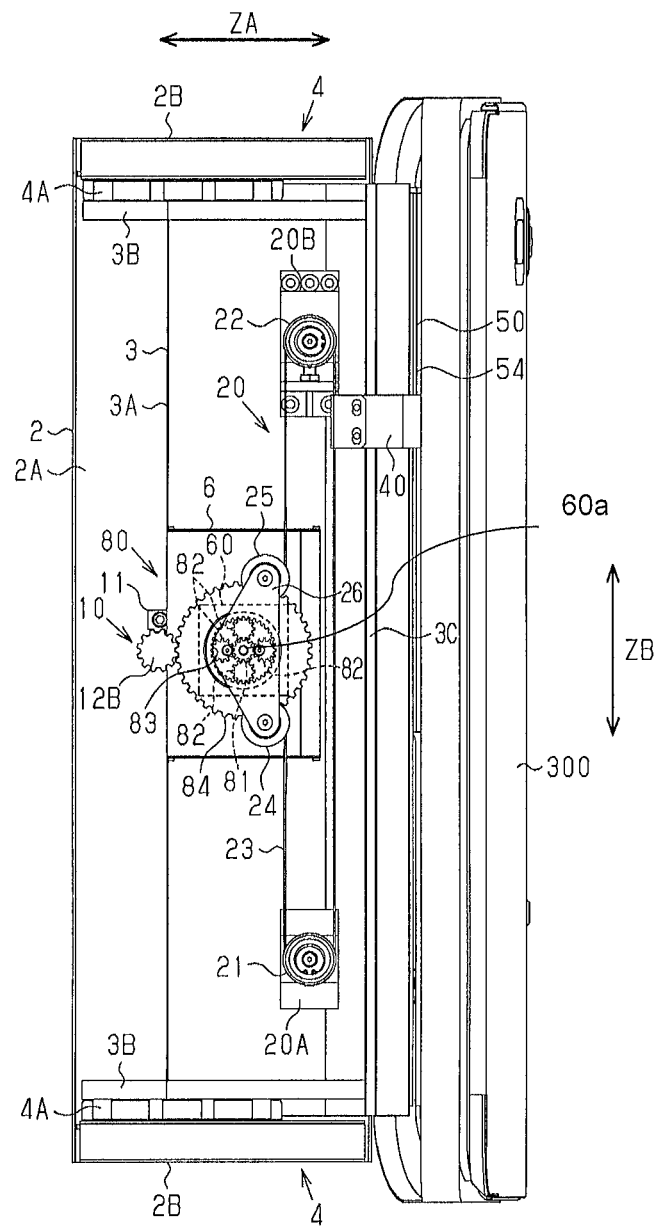
FIG. 4 is a bottom view of the plug door device shown in FIG. 1.

As shown in FIG. 2, the electric motor 60 may be disposed inside the housing case 6 mounted to the slide base portion 3A of the slide base 3. An output shaft 60a, as shown in FIGS. 2 and 4, of the electric motor 60 may be disposed coaxially with the planetary gear mechanism 80. Based on a signal related to an open/close operation of the door 300 outputted by a control portion (depiction thereof is omitted), the electric motor 60 may drive the plug operation portion 10 and the front-back operation portion 20.

As shown in FIG. 3, the movement suppressing portion 70 may include a guide rail 71 that is formed in the fixed base 2, a shaft member 72 that moves along the guide rail 71, and a door coupling member 73 that couples the shaft member 72 to the double-speed rail 50.

The guide rail 71 may be formed through the fixed base portion 2A of the fixed base 2 and include a first portion 71A that extends in the width direction ZA and a second portion 71B that is linked to the first portion 71A and extends in the front-back direction ZB.

The shaft member 72 may be connected to the door coupling member 73. The door coupling member 73 may not be coupled to the slide base 3. Thus, the door coupling member 73 may be movable in the width direction ZA and in the front-back direction ZB together with the door 300.

While the shaft member 72 is moving along the first portion 71A of the guide rail 71, movement in the front-back direction ZB of each of the shaft member 72, the double-speed rail 50 coupled to the shaft member 72 via the door coupling member 73, and the door 300 coupled to the double-speed rail 50 may be suppressed. On the other hand, while the shaft member 72 is moving along the second portion 71B of the guide rail 71, movement in the width direction ZA of each of the shaft member 72, the double-speed rail 50 coupled to the shaft member 72 via the door coupling member 73, and the door 300 coupled to the double-speed rail 50 may be suppressed.

As shown in FIG. 4, the planetary gear mechanism 80 may be disposed below the housing case 6 of the electric motor 60. In a case where movement of the door 300 in the front-back direction ZB is suppressed by the movement suppressing portion 70, the planetary gear mechanism 80 distributes a drive force of the electric motor 60 to the plug operation portion 10. On the other hand, in a case where movement of the door 300 in the front-back direction ZB is not suppressed by the movement suppressing portion 70, the planetary gear mechanism 80 distributes a drive force of the electric motor 60 to the front-back operation portion 20.

The planetary gear mechanism 80 may include a sun gear 81 to which a drive force of the electric motor 60 is inputted, four planetary gears 82 that are engaged with the sun gear 81, a ring gear 83 that is disposed around the planetary gears 82 and engaged with the planetary gears 82, and a carrier 84 that supports the four planetary gears 82.

The belt 23 of the front-back operation portion 20 may be wound around the ring gear 83, and the ring gear 83 may transmit a drive force of the electric motor 60 to the belt 23.

The carrier 84 may be engaged with the relay gear 12B of the plug operation portion 10. The carrier 84 may transmit a drive force of the electric motor 60 to the plug operation portion 10.

Figure 5:
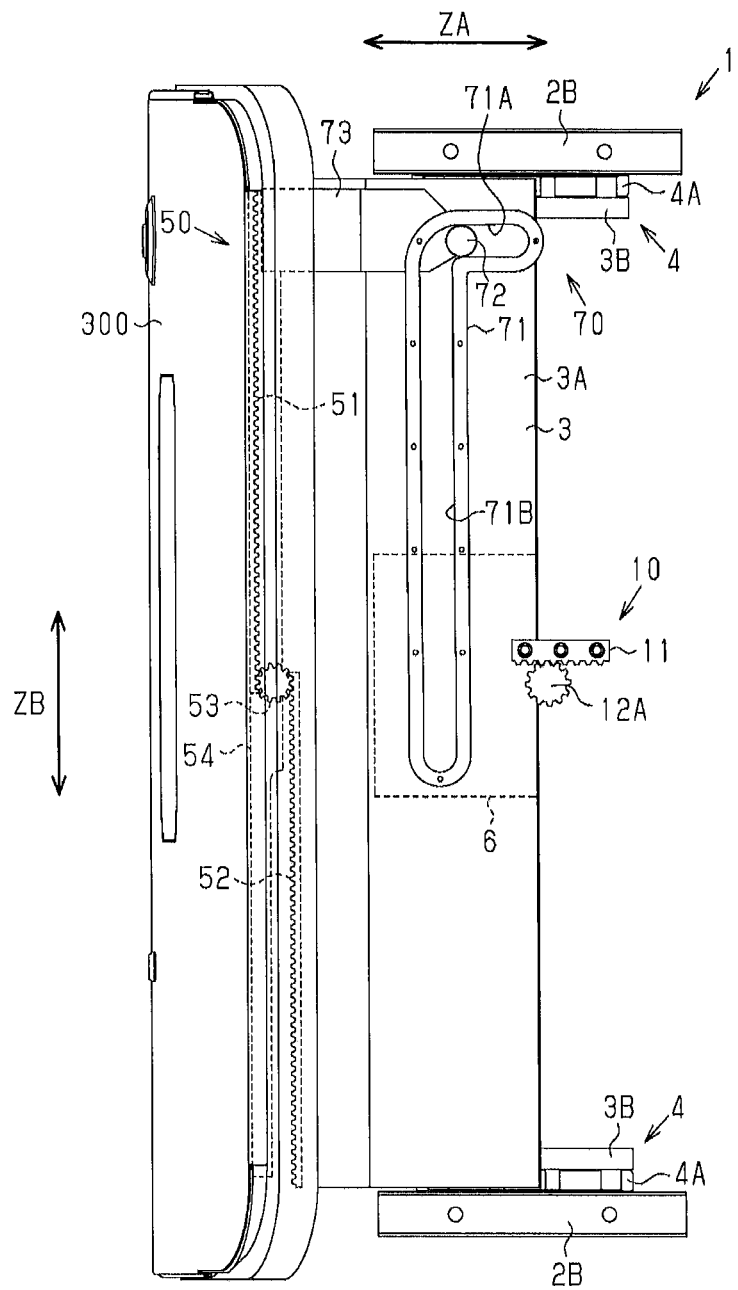
FIG. 5 is a plan view of the plug door device in a case where a door shown in FIG. 1 is performing a plug operation.

With reference to FIG. 3 to FIG. 7, a description is given of an action of the plug door device 1 by using, as an example, a case where the door 300 is moved from the close position to an open position at which the doorway 200 (see FIG. 1) is opened. In FIG. 5, for the sake of simplifying the drawing, depiction of the fixed base portion 2A is omitted.

When moving the door 300 from the close position to the open position, the plug door device 1 may perform a plug operation of moving the door 300 to one side in the width direction ZA and a front-back operation of moving the door 300 to one side in the front-back direction ZB in this order.

As shown in FIG. 3, when the door 300 is at the close position, the shaft member 72 of the movement suppressing portion 70 may be positioned at the first portion 71A of the guide rail 71, and thus movement in the front-back direction ZB may be suppressed. Thus, movement in the front-back direction ZB of the shaft member 72, namely, that of the double-speed rail 50 coupled to the shaft member 72 via the door coupling member 73 may be suppressed.

As shown in FIG. 4, since movement of the door 300 in the front-back direction ZB is suppressed, movement in the front-back direction ZB of the door coupling member 40 coupled to the door 300 via the double-speed rail 50 may be suppressed. Thus, rotation of the belt 23 linked to the door coupling member 40 and rotation of the ring gear 83 around which the belt 23 is wound may be suppressed.

When movement of the door 300 in the front-back direction ZB is suppressed, upon a signal indicating that the doorway 200 is to be opened being inputted from the control device (depiction thereof is omitted) to a control circuit of the electric motor 60, an output shaft of the electric motor 60 may rotate in one direction, and thus a drive force may be inputted to the sun gear 81 of the planetary gear mechanism 80, Rotation of the sun gear 81 may be transmitted to the four planetary gears 82.

Since rotation of the ring gear 83 is suppressed, the four planetary gears 82 may revolve about the sun gear 81 while rotating on their own axes, Thus, rotation of the four planetary gears 82 may be transmitted to the carrier 84 to cause the carrier 84 to rotate.

Rotation of the carrier 84 may be transmitted to the pinion 12A via the relay gear 12B and the coupling shaft 12C of the plug operation portion 10. As shown in FIG. 5, the pinion 12A may rotate to move in the width direction ZA along the rack 11. Thus, the in-base placement portion 30 (see FIG. 4) linked to the rotary portion 12 and the slide base 3 to which the in-base placement portion 30 is fixed may move in the width direction ZA while being supported by the guiding support portion 4. Furthermore, the double-speed rail 50 (see FIG. 4) connected to the in-base placement portion 30 via the door coupling member 40 (see FIG. 4) and the door 300 may move in the width-direction ZA.

With the door 300 moving in the width direction ZA, the door coupling member 73 coupled to the double-speed rail 50 and the shaft member 72 connected to the door coupling member 73 may move along the first portion 71A of the guide rail 71.

When the shaft member 72 has moved to one end portion of the first portion 71A in the width direction ZA, movement in the front-back direction ZB of the shaft member 72, namely, that of the door 300 coupled to the shaft member 72 via the door coupling member 73 may be permitted Thus, the shaft member 72 may move from the first portion 71A to the second portion 71B.

With movement of the door 300 in the front-back direction ZB being permitted, movement in the front-back direction ZB of the door coupling member 40 coupled to the door 300 via the double-speed rail 50 may be permitted. Thus, suppression of rotation of the belt 23 linked to the door coupling member 40 may be released, and rotation of the ring gear 83 around which the belt 23 is wound may be permitted.

On the other hand, when the shaft member 72 is at the second portion 71B of the guide rail 71, movement in the width direction ZA of the shaft member 72, namely, that of the double-speed rail 50 coupled to the shaft member 72 via the door coupling member 73 may be suppressed. Thus, rotation of the rotary portion 12 and rotation of the carrier 84 engaged with the relay gear 12B of the rotary portion 12 may be suppressed. Thus, even in a case where a force is applied to the door 300 against open/close movement of the door 300 in the front-back direction ZB, the door 300 may be prevented from moving in the width direction ZA.

When rotation of the carrier 84 is suppressed, the four planetary gears 82 may rotate on their own axes around the sun gear 81. Thus, rotation of the four planetary gears 82 may be transmitted to the ring gear 83 to cause the ring gear 83 to rotate. With the ring gear 83 rotating, the belt 23 wound around the ring gear 83 may rotate.

Figure 6:
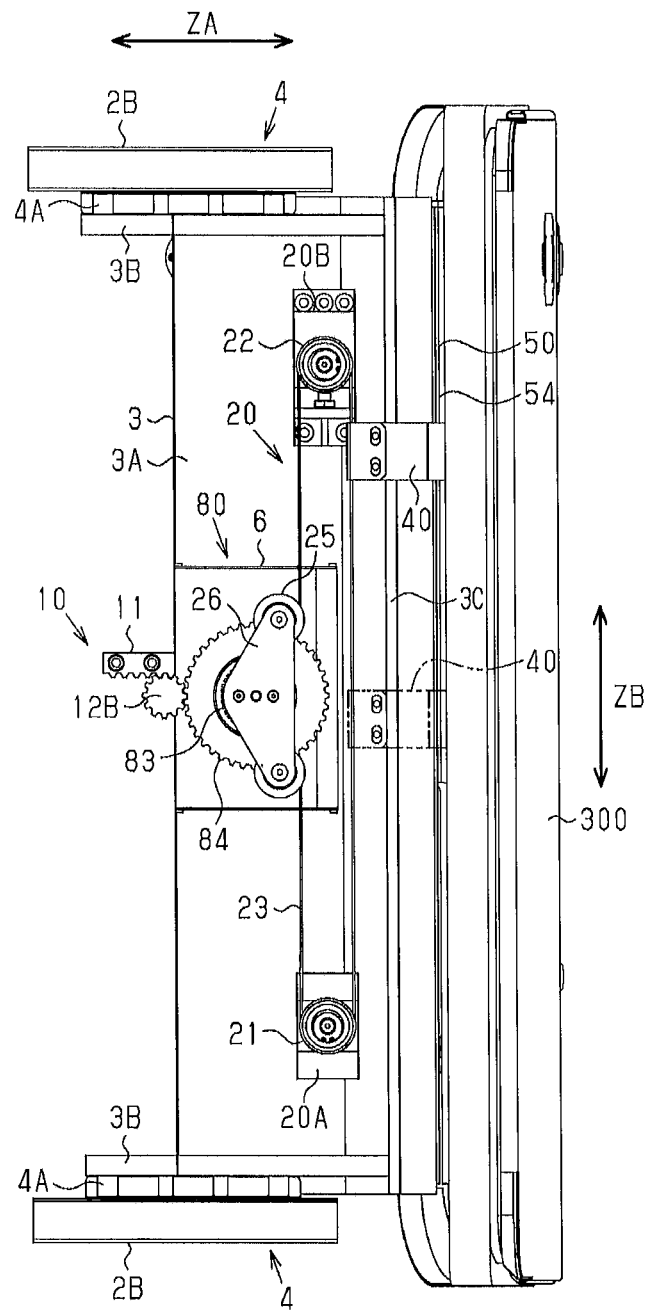
FIG. 6 is a bottom view of the plug door device shown in FIG. 5.

As shown in FIG. 6, with the belt 23 rotating, the door coupling member 40 connected to the belt 23 may move in the front-back direction ZB toward a position shown by a chain double-dashed line. Thus, the pinion support portion 54 of the double-speed rail 50 connected to the door coupling member 40 and the pinion 53 (see FIG. 7) supported by the pinion support portion 54 may move in the front-back direction ZB.

Figure 7:
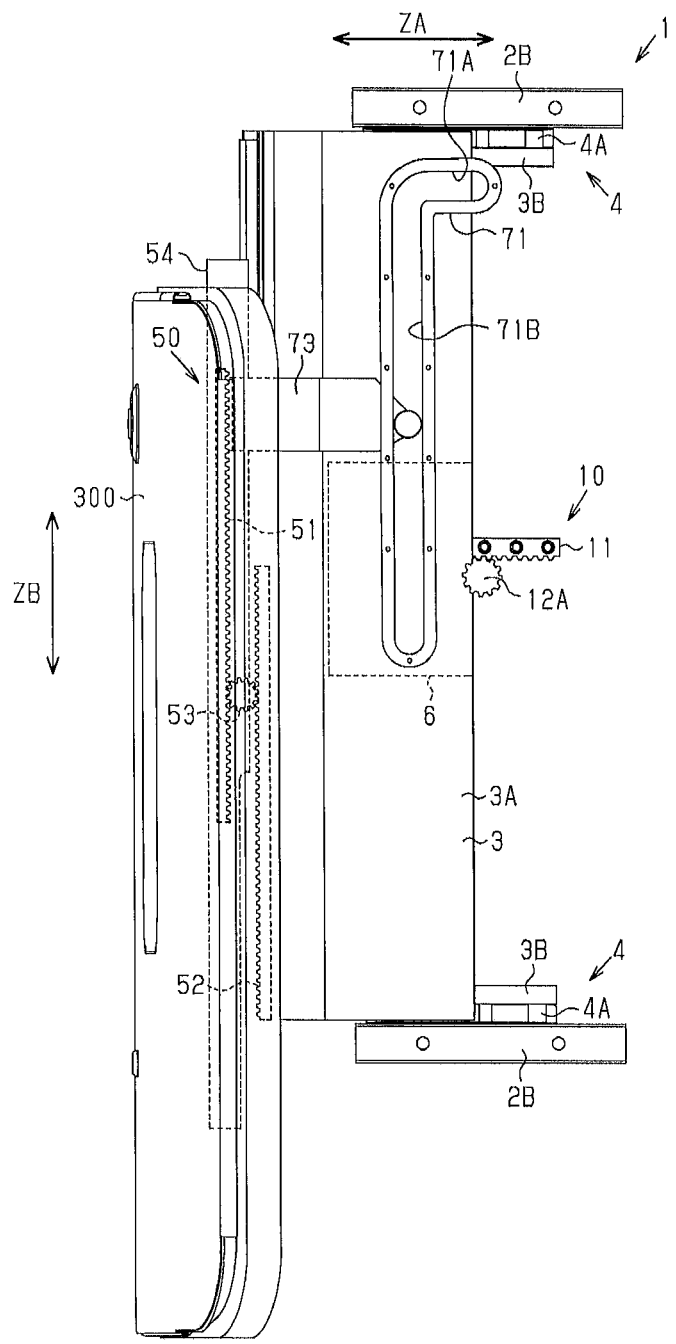
FIG. 7 is a plan view of the plug door device in a case where a door shown in FIG. 6 is performing a front-back operation.

As shown in FIG. 7, the pinion 53 may move to one side in the front-back direction ZB with respect to the base-side rack 52 while being engaged with the base-side rack 52. Furthermore, with respect to the pinion 53 moving to one side in the front-back direction ZB, the door-side rack 51 engaged with the pinion 53 and the door 300 connected to the door-side rack 51 may move to the one side in the front-back direction ZB, and thus the door 300 may be brought to the open position. The door-side rack 51 may move to the one side in the front-back direction ZB together with the pinion 53, and thus an amount of movement of the door-side rack 51 with respect to the base-side rack 52 may be double an amount of movement of the pinion 53 with respect to the base-side rack 52. That is, an amount of movement of the door 300 with respect to the door-side rack 52 may be double an amount of movement of the door coupling member 40 (see FIG. 6) with respect to the base-side rack 52.

On the other hand, when moving the door 300 from the open position to the close position, the plug door device 1 may perform a front-end operation of moving the door 300 to the other side in the front-back direction ZB and a plug operation of moving the door 300 to the other side in the width direction ZA in this order.

According to the plug door device 1, the following effects can be obtained: (1) By using the single electric motor 60, there can be performed an open/close operation of the door 300 in which movement of the door 300 in the width direction ZA is independent of movement of the door 300 in the front-back direction ZB, and thus a contribution can be made to a size reduction of the plug door device 1.

(2) In a case where only movement of the door 300 in the width direction ZA is permitted by the movement suppressing portion 70, independently of movement of the door 300 in the front-back direction ZB, only movement of the door 300 in the width direction ZA can be performed. Thus, compared with a case where movement of the door 300 in the width direction ZA is performed at the same time as movement of the door 300 in the front-back direction ZB, the seal member at the outer edge of the door 300 may be unlikely to considerably rub against the wall surface of the doorway 200, and thus a decrease in airtightness of the door 300 can be suppressed.

(3) After the door 300 has moved a predetermined distance from the close position to one side in the width direction ZA, the movement suppressing portion 70 may release suppression of movement of the door 300 in the front-back direction ZB, and thus it may be easy to perform movement of the door 300 in the width direction ZA and movement of the door 300 in the front-back direction ZB independently of each other.

(4) The plug operation portion 10 may be configured by including the rack 11 and the pinion 12A, and thus a configuration of the plug door device 1 can be simplified.

(5) The movement suppressing portion 70 can be constituted by the guide rail 71 and the shaft portion 72 that moves along the guide rail 71, and thus a configuration of the plug door device 1 can be simplified.

(6) The shaft member 72 may move along the guide rail 71 formed through the fixed base 2, and thus there can be performed an open/close operation of the door 300 in which movement of the door 300 in the width direction ZA is independent of movement of the door 300 in the front-back direction ZB. Thus, in order to be able to realize an open/close operation of the door 300, the slide base 3 is only required to move in the width direction ZA, and thus a configuration of the plug door device 1 can be simplified.

(7) The pinion 12A may move along the rack 11 mounted to the fixed base 2, and thus the slide base 3 and the door 300 can be moved in the width direction ZA with respect to the fixed base 2, so that a configuration of the plug door device 1 can be simplified.

(8) The in-base placement portion 30 of the front-back operation portion 20 may be disposed within a width of the doorway 200 in the front-back direction ZB, and thus an increase in installation space of the plug door device 1 can be suppressed.

(9) The guiding support portion 4 may be mounted between each of the pair of fixed side walls 2B of the fixed base 2 and an opposing one of the pair of slide side walls 3B of the slide base 3, and thus movement of the slide base 3 and the door 300 in the width direction ZA can be performed smoothly.

(10) The output shaft of the electric motor 60 may be disposed coaxially with the planetary gear mechanism 80, and thus compared with a case where the output shaft of the electric motor 60 is not disposed coaxially with the planetary gear mechanism 80, a further size reduction of the plug door device 1 can be achieved.

(Modification Examples) The foregoing description of the embodiment is illustrative of a possible mode of the plug door device according to the present invention and is not intended to limit the mode thereto. The plug door device according to the present invention can adopt, for example, modification examples of the embodiment, which are described below, and a combination of at least two modification examples that are not mutually contradictory. Furthermore, while in the above-described embodiment, the plug door device according to the present invention is applied to a single sliding door, the plug door device according to the present invention is applicable also to a double sliding door composed of two doors that operate in conjunction with each other.

In the above-described embodiment, it may also be possible to configure the movement suppressing portion 70 as in, for example, (a) or (b) below: (a) It may also be possible that the second portion 71B of the guide rail 71 is shaped to extend in the width direction ZA and in the front-back direction ZB. According to a movement suppressing portion 70 of this modification example, when the shaft member 72 is moving along the first portion 71A, movement of the door 300 in the width direction ZA may be permitted, while movement of the door 300 in the front-back direction ZB may be suppressed. Furthermore, when the shaft member 72 is moving along the second portion 71B, movement of the door 300 in the width direction ZA and movement of the door 300 in the front-back direction ZB may be permitted That is, in an open/close operation of the door 300, the movement suppressing portion 70 of this modification example may not suppress movement of the door 300 in the width direction ZA.

(b) It may also be possible that the shaft member 72 has such a dimension in a longitudinal direction thereof as to protrude from an upper surface of the fixed base portion 2A, According to a movement suppressing portion 70 of this modification example, the shaft member 72 may be unlikely to come out of the guide rail 71, and thus an open/close operation of the door 300 can be performed more smoothly.

In the above-described embodiment, it may also be possible to configure the planetary gear mechanism 80 as in, for example, (a) to (d) below: (a) In the above-described embodiment, in order to generate a larger drive force with respect to movement of the door in the width direction ZA than a drive force with respect to movement of the door in the front-back direction ZB, the carrier 84, which is likely to provide a high reduction gear ratio, may be engaged with the relay gear 12B of the plug operation portion 10. It may, however; also be possible that the ring gear 83 is engaged with the relay gear 12B of the plug operation portion 10, and the belt 23 of the front-back operation portion 20 is wound around the carrier 84. According to a plug door device 1 of this modification example, in a case where movement of the door 300 in the front-back direction ZB is suppressed by the movement suppressing portion 70, a drive force of the electric motor 60 inputted to the sun gear 81 may be transmitted to the ring gear 83 via the four planetary gears 82, and thus the pinion 12A rotates to cause the door 300 to move in the width direction ZA, On the other hand, in a case where movement of the door 300 in the front-back direction ZB is not suppressed by the movement suppressing portion 70, a drive force of the electric motor 60 inputted to the sun gear 81 may be transmitted from the carrier 84 to the belt 23 of the front-back operation portion 20 via the four planetary gears 82. Thus, the door 300 may move in the front-back direction ZB.

(b) It may also be possible that the number of the planetary gears 82 is two, three, five or more. (c) It may also be possible that the number of teeth of the ring gear 83 is smaller than the number of teeth of the sun gear 81 and than the number of teeth of each of the planetary gears 82. (d) It may also be possible that the number of teeth of the ring gear 83 is larger than the number of teeth of the carrier 84. In the above-described embodiment, it may also be possible that the rack 11 and the rotary portion 12 of the plug operation portion 10 are changed in configuration to a crank mechanism or a ball screw mechanism. The bottom line is that the plug operation portion 10 is only required to include a mechanism that can convert rotary motion of the planetary gear mechanism 80 into linear motion.

What is claimed is:

1. A plug door device, comprising:
    a drive source;
    a plug operation portion configured to move, based on a drive force of the drive source, a door installed at a doorway of a vehicle in a width direction of the vehicle;
    a front-back operation portion configured to move, based on the drive force of the drive source, the door in a front-back direction of the vehicle;
    a movement suppressing portion configured to suppress movement of the door in the front-back direction, wherein the movement suppressing portion includes:
    a guide rail mounted to the vehicle; and
    a shaft member mounted to the door and configured to move along the guide rail, wherein the guide rail includes a first portion extending in the width direction and configured to suppress movement of the shaft member in the front-back direction;
    a planetary gear mechanism configured to:
    distribute the drive force of the drive source to the plug operation portion in a case where movement of the door in the front-back direction is suppressed by the movement suppressing portion, and
    distribute the drive force of the drive source to the front-back operation portion in a case where movement of the door in the front-back direction is not suppressed by the movement suppressing portion;
    a fixed base fixed to the vehicle and including the guide rail; and
    a slide base movable in the width direction with respect to the fixed base by the plug operation portion, the slide base having the drive source, the front-back operation portion, and the planetary gear mechanism mounted thereto.

2. The plug door device according to claim 1, wherein during a time when the door moves a predetermined distance in the width direction from a closed position at which the doorway is closed, the movement suppressing portion suppresses movement of the door in the front-back direction, and when the door is at a position to which the door has moved the predetermined distance in the width direction from the closed position, the movement suppressing portion permits movement of the door in the front-back direction.

3. The plug door device according to claim 1, wherein the plug operation portion includes:
    a rack fixed to the vehicle and extending in the width direction of the vehicle; and
    a pinion engaged with the rack, the drive force of the drive source being transmitted to the pinion via the planetary gear mechanism.

4. The plug door device according to claim 3, wherein the planetary gear mechanism includes a sun gear, a plurality of planetary gears, a ring gear, and a carrier, the drive force of the drive source being inputted to the sun gear, the plurality of planetary gears being engaged with the sun gear, the ring gear being disposed around the plurality of planetary gears and engaged with the plurality of planetary gears, the carrier being configured to support the plurality of planetary gears, rotation of one of the ring gear and the carrier is transmitted to the pinion to cause the door to move in the width direction, and rotation of the other of the ring gear and the carrier is transmitted to the front-back operation portion to cause the door to move in the front-back direction.

5. The plug door device according to claim 1, wherein the guide rail includes a second portion extending in the front-back direction continuously with the first portion and configured to permit movement of the shaft member in the front-back direction, while suppressing movement of the shaft member in the width direction.

6. The plug door device according to claim 1, wherein the plug operation portion includes:

a rack fixed to the vehicle and extending in the width direction of the vehicle; and a pinion engaged with the rack, the drive force of the drive source being transmitted to the pinion via the planetary gear mechanism, wherein the rack is mounted to the fixed base.

7. The plug door device according to claim 1, wherein the front-back operation portion includes:

a pair of pulleys disposed within a width of the doorway in the front-back direction so as to be spaced from each other in the front-back direction; and a belt wound around the pair of pulleys.

8. The plug door device according to claim 1, further comprising: a guiding support portion configured to support the slide base and guide movement of the slide base in the width direction with respect to the fixed base, wherein the guiding support portion is mounted to end portions of the slide base in the front-end direction.

9. The plug door device according to claim 1, wherein an output shaft of the drive source is disposed coaxially with the planetary gear mechanism.

* * * * *